United States Patent
Blanc et al.

(10) Patent No.: US 7,239,534 B2
(45) Date of Patent: Jul. 3, 2007

(54) CELLULAR INVERTER WITH REDUCED SWITCHING DISTORTION RATE

(75) Inventors: Flavien Blanc, Valence (FR); Christophe Taurand, Valence (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/578,309

(22) PCT Filed: Oct. 11, 2004

(86) PCT No.: PCT/EP2004/052491

§ 371 (c)(1), (2), (4) Date: May 4, 2006

(87) PCT Pub. No.: WO2005/046039

PCT Pub. Date: May 19, 2005

(65) Prior Publication Data

US 2007/0070666 A1    Mar. 29, 2007

(30) Foreign Application Priority Data

Nov. 4, 2003    (FR) .................................. 03 12929

(51) Int. Cl.
*H02M 1/12* (2006.01)
(52) U.S. Cl. .......................... 363/41; 363/71; 363/132; 307/86
(58) Field of Classification Search .............. 363/40, 363/41, 56.02, 71, 98, 132; 307/82, 85, 86
See application file for complete search history.

(56) References Cited

U.S. PATENT DOCUMENTS

| | | | |
|---|---|---|---|
| 4,161,771 A * | 7/1979 | Bates | 363/71 |
| 5,636,108 A | 6/1997 | Taurand | |
| 5,734,565 A | 3/1998 | Mueller et al. | |
| 5,745,351 A | 4/1998 | Taurand | |
| 6,121,768 A | 9/2000 | Taurand | |
| 6,285,568 B1 | 9/2001 | Taurand | |
| 6,462,558 B1 | 10/2002 | Taurand | |
| 6,473,323 B1 | 10/2002 | Taurand | |
| 6,556,461 B1 * | 4/2003 | Khersonsky et al. | 363/41 |
| 6,606,022 B1 | 8/2003 | Taurand | |
| 6,975,097 B2 | 12/2005 | Taurand et al. | |
| 6,987,680 B2 | 1/2006 | Vire et al. | |
| 7,135,847 B2 | 11/2006 | Taurand | |

* cited by examiner

*Primary Examiner*—Jessica Han
(74) *Attorney, Agent, or Firm*—Lowe Hauptman & Berner, LLP

(57) ABSTRACT

A cellular inverter generates an alternating output voltage by a succession of serial combinations of DC voltage electrical sources that are available to it within switchable cells and, within a serial combination currently in use, by a voltage regulation using high-frequency chopping. This voltage regulation exhibits a certain lag and allows through an undesirable voltage step during the repositioning of its operating range caused by a change of the serial combination currently in use. The cellular inverter proposed comprises, in its high-frequency switch-mode voltage regulation circuit illustrated in the figure, a pre-compensation circuit that allows the lag to be compensated for and this undesirable voltage step to be considerably attenuated.

6 Claims, 3 Drawing Sheets

CELLULAR INVERTER WITH REDUCED SWITCHING DISTORTION RATE

CROSS-REFERENCE TO RELATED APPLICATIONS

The present Application is based on International Application No. PCT/EP2004/052491, filed on Oct. 11, 2004, which in turn corresponds to FR 03/12929 filed on Nov. 4, 2003, and priority is hereby claimed under 35 USC §119 based on these applications. Each of these applications are hereby incorporated by reference in their entirety into the present application.

FIELD OF THE INVENTION

The present invention relates to equipment providing the conversion of a DC electrical voltage into an alternating electrical voltage. More particularly, it relates to inverters of the cellular type that generate a sinusoidal alternating voltage from a succession of various serial combinations of several electrical sources of DC voltage.

DESCRIPTION OF THE RELATED ART

A cellular inverter is composed of a series of several elementary cells of the same configuration and of a switching control unit.

The elementary cells have a bridge structure with a controlled switch in each of the branches of the bridge and an electrical source of DC voltage in a first diagonal of the bridge. They are connected in series via the second diagonal of their bridge structure. The controlled switch bridge of an elementary cell allows the possibility of inserting or not, in one or other of the polarization directions, its DC voltage electrical source into the series that it forms with the other cells. Thanks to the controlled switch bridges of the various elementary cells, from the series of elementary cells of a cellular inverter all the possible serial combinations of the available electrical sources of DC voltage may be formed. In actual practice, only the serial combinations where the electrical sources of the elementary cells are placed in the same polarization direction are of interest.

The switching control unit provides the control of the controlled switches of the various elementary cells in order to obtain, between the two ends of the series, an electrical voltage with sinusoidal amplitude variation. For this purpose, it has a setpoint for the electrical voltage to be developed across the ends of the series of cells that is periodically updated. This electrical voltage setpoint, expressed as an algebraic value, corresponds to a sampling, in amplitude and sign, of a mode of the sinusoidal alternating voltage having the desired frequency and phase.

In order to reproduce the current electrical voltage setpoint, the switching control unit establishes the serial combination of the available DC voltage electrical sources that best approximates it from above, then uses a high-frequency switch-mode voltage regulation implementing controlled switches from the elementary cells of the series in order to bring the instantaneous voltage delivered by the retained serial combination of the DC voltage electrical sources to the precise value of the setpoint.

Since the electrical voltage setpoint progressively follows a sinusoidal variation, the need to change the serial combination of DC voltage electrical sources currently in use only arises when the high-frequency switch-mode voltage regulation reaches a limit, at the lower end or at the higher end, and must have its capture range re-centered in order to continue to operate correctly. For this reason, the changes in serial combination of DC voltage electrical sources are controlled by limit reach signals coming from the high-frequency switch-mode voltage regulation. An upper limit reach signal corresponds to a request for switching to a new serial combination of DC voltage electrical sources delivering, from above, the algebraic voltage value corresponding to the current setpoint with a greater margin than the combination currently being used, hence to an incrementation request. A lower limit reach signal corresponds to a request for switching to a new serial combination of DC voltage electrical sources delivering, from above, the algebraic voltage value corresponding to the current setpoint with a smaller margin than the combination currently being used, hence to a decrementation request.

The execution of a change of serial combination of the DC voltage electrical sources following an incrementation request or a decrementation request from the high-frequency switch-mode voltage regulator causes a voltage jump at the output of the cellular inverter which is corrected by the high-frequency switch-mode voltage feedback control but which generates noise in the output signal of the cellular inverter during the reaction time of the high-frequency switch-mode voltage feedback control.

SUMMARY OF THE INVENTION

It is an object of this invention to reduce the reaction time of the high-frequency switch-mode voltage feedback control to the voltage jumps from the changes of serial combination of the DC voltage electrical sources in order to reduce the switching distortions affecting the output signal from a cellular inverter.

According to the invention, a cellular inverter for generating an alternating electrical voltage from a succession of various serial combinations of DC voltage electrical sources comprises, on the one hand, a series of several elementary cells, and on the other, a switching control unit. The elementary cells have a bridge structure with a controlled switch in each of the branches of the bridge and a DC voltage electrical source in a first diagonal of the bridge. They are interconnected within the series via the second diagonal of their bridge structure. The switching control unit delivers the control commands for the controlled switches of the various elementary cells. It comprises a high-frequency switch-mode voltage regulation circuit and a circuit for selecting the serial combination of the DC voltage electrical sources of the elementary cells in service. The switch-mode voltage regulation circuit operates so as to minimize an error signal that is representative of the difference existing between the electrical voltage present across the ends of the series of cells and a variable voltage setpoint sampling a model form of alternating voltage, and generates signals indicating arrival at upper and lower limits of its range of operation. The combination selection circuit is controlled by means of the signals indicating arrival at upper and lower limits of range of operation delivered by the high-frequency switch-mode voltage regulation circuit. This cellular inverter is noteworthy in that its switching control unit comprises a high-frequency switch-mode regulation circuit equipped with a pre-compensation device that is controlled by the signals indicating arrival at upper and lower limits of range of operation and that corrects its lag during a voltage jump caused by a change of the serial combination of DC voltage electrical sources currently in use.

Advantageously, the pre-compensation circuit takes into account the values of the voltage jumps associated with the combination changes undertaken by the combination selection circuit, the combination change moments indicated by the limit reach signals and the reaction time of the high-frequency switch-mode voltage regulation circuit.

Advantageously, the pre-compensation device comprises a compensation form generator controlled by means of the limit reach signals and an adder circuit that adds the compensation form delivered by the compensation form generator circuit to a signal from the high-frequency switch-mode voltage regulation circuit fixing the duration of a chopping period assigned to the conduction.

Advantageously, the compensation form generator circuit is a memory storing, in sampled form, various forms of compensation established by experimentation for each combination change generated by the combination selection circuit.

Advantageously, the compensation form generator circuit is a memory that contains compensation forms associated with the DC voltage jumps encountered during the combination changes and that is addressed by an addressing circuit deducing, from the limit reach signals, the DC voltage jump corresponding to the combination change carried out by the combination selection circuit.

BRIEF DESCRIPTION OF THE DRAWINGS

Other advantages and features of the invention will become apparent from the description that follows of one embodiment given by way of example. This description will be presented with regard to the drawing in which.

a FIG. 1 is a schematic layout of a cellular inverter.

DETAILED DESCRIPTION OF THE EMBODIEMENTS

A cellular inverter is built from elementary cells C1, C2, ..., CN each comprising an electrical source of DC voltage Vi, with i∈1 to N, placed in one of the diagonals of a bridge of four controlled switches STi, SBi, STib and SBib. The elementary cells C1, C2, ..., CN are arranged in series between the output terminals 0 and Vout of the cellular inverter via the diagonal of their bridge of controlled switches that does not include their DC voltage electrical source Vi. Their number depends on the desired output peak-to-peak amplitude of the alternating electrical voltage and the values of the voltages of their DC voltage electrical sources. The commands GTi and GBi for the controlled switches STi and SBi are complementary and non-overlapping to avoid short-circuiting the DC voltage electrical source Vi. The same is true of the commands GTib and GBib for the controlled switches STib and SBib.

The various commands for the controlled switches of the elementary cells C1, ..., CN are supplied by a switching control unit 10. This tries to reproduce a variable voltage setpoint sampling a model form of alternating voltage by establishing, by manipulation of the controlled switches, a serial combination of the available DC voltage electrical sources that best approximates from above the instantaneous value, in algebraic value, of the setpoint in question then, again by manipulating the controlled switches, to bring, by high-frequency switch-mode voltage regulation, the instantaneous voltage delivered by the retained serial combination of the DC voltage electrical sources to the precise value of the current setpoint. For this purpose, it disposes of a high-frequency switch-mode voltage regulator 100 controlling a serial combination selector 200.

The output voltage Vout is filtered by a low-pass filter, not shown, in order to eliminate the chopping high frequency.

In most cases, the DC voltage electrical sources of the elementary cells have the same value V. The usual mode of operation of the control unit 10 consists in always taking the elementary cells C1, ..., CN into account in the same order, the first, always selected, being solicited for the high-frequency switch-mode voltage regulation and the following N−1 elementary cells being put progressively into service or taken out in order to add or subtract the DC voltages of their electrical sources when the high-frequency switch-mode voltage regulation does not suffice on its own to follow the natural variation of the instantaneous voltage of the model of alternating voltage taken as reference.

Figure 1:
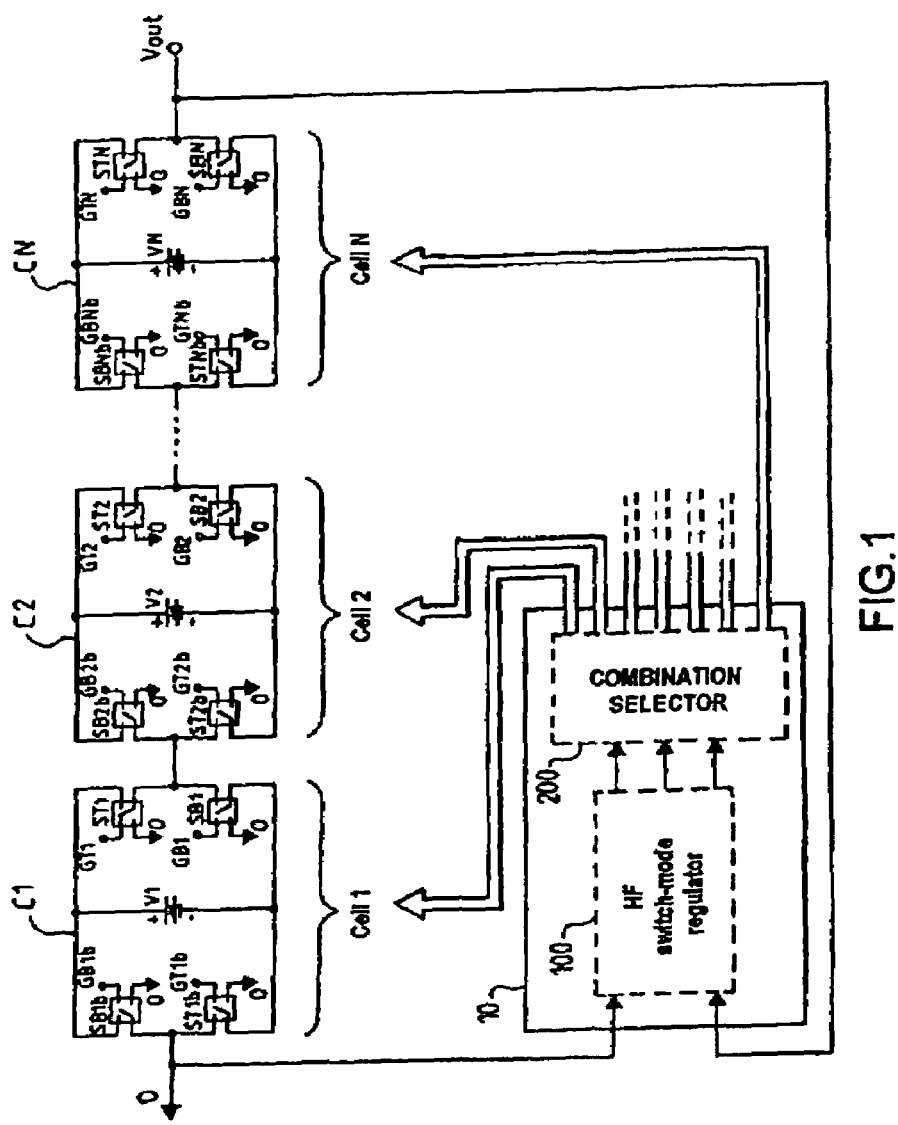
Figure 2:
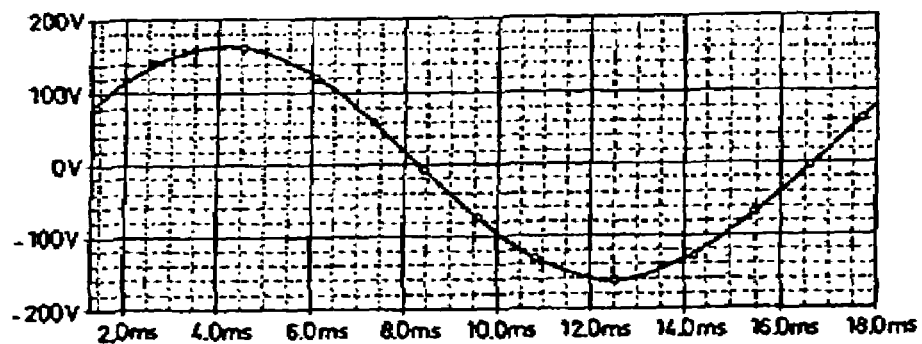
FIGS. 2 and 3 are diagrams of curves illustrating one mode of a FIG. 4 is a schematic layout of the high-frequency switch-mode voltage regulation circuit of a known type of cellular inverter, and a FIG. 5 is a schematic layout of a high-frequency switch-mode voltage regulation circuit of a cellular inverter according to the invention.
Figure 3:
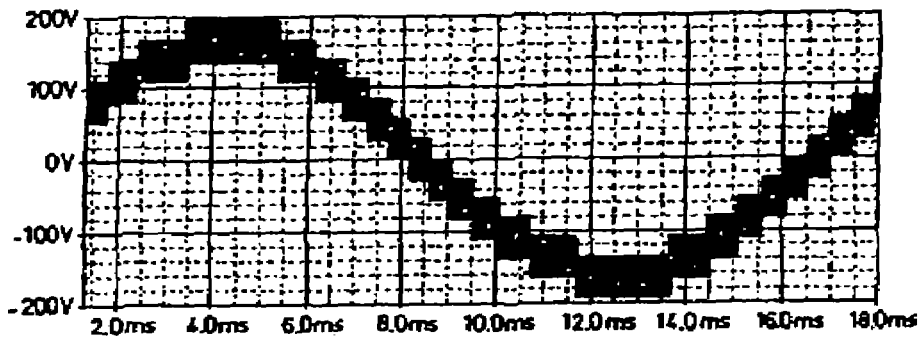

FIGS. 2 and 3 illustrate the behavior of a cellular inverter with seven elementary cells having DC voltage electrical sources of 28 volts, which is required to supply an alternating voltage at a frequency of 60 Hertz with an r.m.s. value of 115 volts, and having a switching control unit delivering the commands for the controlled switches of the seven elementary cells according to the usual mode of operation.

One of the elementary cells always taken into account, here the elementary cell C1, has its controlled switches ST1, SB1, ST1$b$ and SB1$b$ switched by the high-frequency switch-mode voltage regulator 100 of the control unit 10, at a high frequency of around 200 kHz. The other elementary cells C2 to C7 are brought into service by the serial combination selector 200 of the control unit 10 so as to re-center the operating range of the high-frequency switch-mode voltage regulator 100 when it indicates that it has reached the limit of its operating range, either at the higher end or at the lower end.

FIG. 2 shows the voltage setpoint over one period of the sinusoidal alternating voltage model to be followed.

FIG. 3 shows the output voltage Vout of the cellular inverter resulting from the switching operations of the controlled switches of its elementary cells C1, ..., CN following the orders given by its switching control unit 10. The output voltage of the cellular inverter approximates the sinusoidal form of the voltage of the model to be followed by a succession of plateaus separated by jumps of 28 volts, each plateau being chopped at high frequency between +28 volts and −28 volts.

Figure 4:
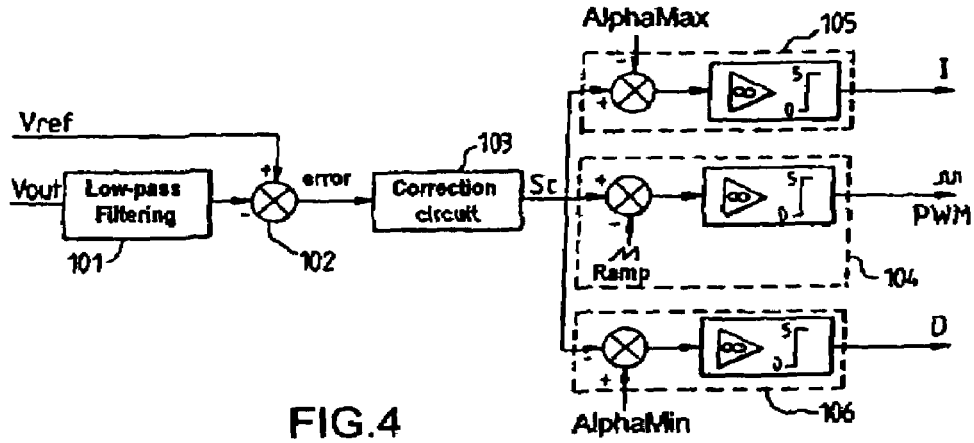

FIG. 4 details the usual structure of the high-frequency switch-mode voltage regulator 100 of a cellular inverter. This comprises a low-pass noise-suppression filter 101 receiving the output voltage Vout of the cellular inverter, a comparator 102 comparing the output signal from the low-pass filter 101 with a setpoint Vref, a correction circuit 103 generating a signal Sc fixing the conduction time during a high-frequency chopping period, a pulse generator 104, connected after the correction circuit 103, supplying, at the rate of the high-frequency chopping, PWM pulses modulated in width by the signal Sc from the correction circuit for the close command to the controlled switch of the elementary cell C1, a circuit 105 for detecting the arrival at the upper limit of the regulation range connected after the correction circuit 103, delivering an upper limit reach signal I corresponding to a demand for an increase in the DC electrical voltage made available to the regulator 100 and a circuit 106 for detecting the arrival at the lower limit of the regulation range connected after the correction circuit 103, delivering a signal D demanding a decrease in the DC electrical voltage made available to the regulator.

The correction circuit 103 is an integrator circuit of reasonably high order whose function is to extract from the error signal the value of the conduction time within a high-frequency chopping period which is best suited to canceling the error signal.

The PWM generator of width-modulated pulses 104 is generally composed of a ramp generator at the switch-mode frequency, of a comparator circuit subtracting, from the feedback control signal generated by the correction circuit 103, the ramp generator signal and of a limiting-amplifier circuit placed at the output.

The circuit 105 for detecting the arrival at the upper limit of the regulation range is generally composed of a comparator subtracting, from the feedback control signal generated by the correction circuit 103, a threshold value AlphaMax and of a limiting-amplifier circuit placed at the output.

The circuit 106 for detecting the arrival at the lower limit of the regulation range is generally composed of a comparator subtracting, from a threshold value AlphaMin, the feedback control signal generated by the correction circuit 103 and of a limiting-amplifier circuit placed at the output.

The signals I and D from the limit reach detectors 105 and 106 are applied to the serial combination selector 200 to order a change of serial combination of DC voltage electrical sources currently in use, either to increase the DC electrical voltage made available to the HF switch-mode voltage regulator, or to decrease it. The signal from the PWM width-modulated pulse generator is delivered to the controlled switches of the elementary cell C1 via the serial combination selector 200, since the switch pair SB1, SB1*b* or ST1, ST1*b*, receiving the PWM signal or the signal complementary to the PWM signal at its control input, is chosen by the latter.

With such a structure, undesirable voltage steps appear on the cellular inverter output signal when serial combination changes of DC voltage electrical sources occur, owing to the time required by the correction circuit 103 to reposition itself.

In order to deal with these undesirable voltage steps affecting the output signal of a cellular inverter when serial combination changes of DC voltage electrical sources currently in use occur, the high-frequency switch-mode voltage regulator circuit 100 is provided with a pre-compensation controlled by the output signals I and D from the circuits 105, 106 for detecting the arrival at limits of regulation range that allows its correction circuit to be repositioned without delay.

Figure 5:
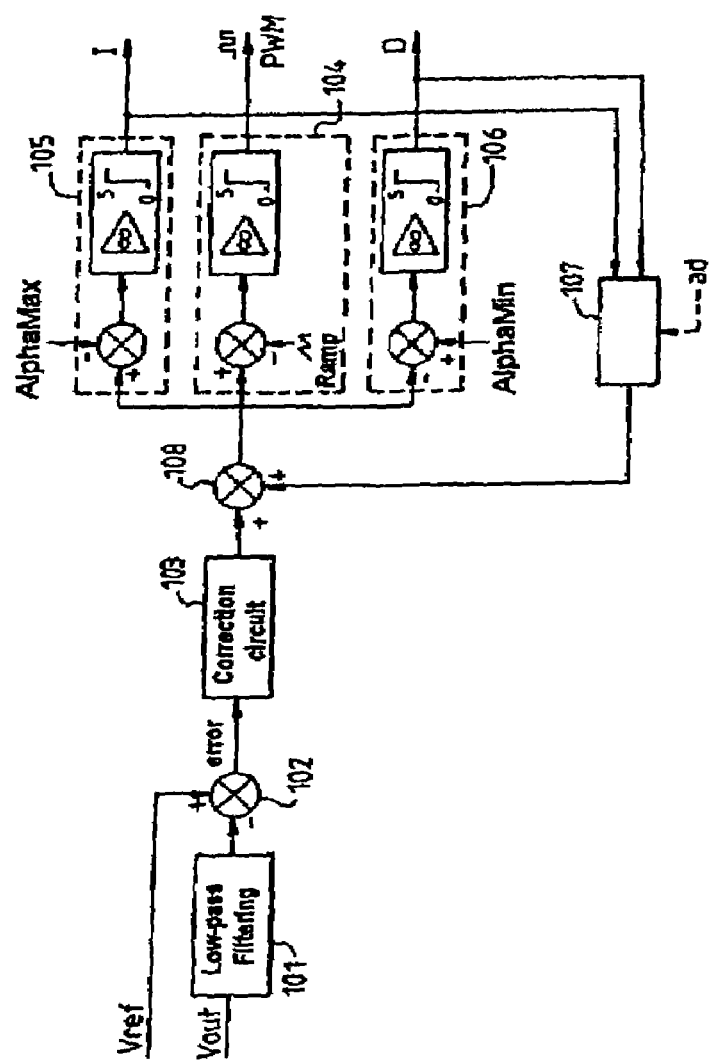

FIG. 5 gives an example structure of a high-frequency switch-mode voltage regulator for cellular inverter including a pre-compensation circuit. This regulator comprises all the same elements as the regulator in FIG. 4, which have kept the same references, with, in addition, a compensation form generator 107 controlled by the output signals I and D from the circuits 105, 106 for detecting the arrival at limits of regulation range and an adder 108 inserted downstream of the correction circuit 103, before the PWM width-modulated pulse generator 104 and the circuits 105, 106 for detecting the arrival at limits of regulation range.

The compensation form generator 107 is a memory that stores, in sampled form, the forms of feedback control signals adapted to the correction of undesirable voltage steps appearing, in the absence of pre-compensation, at the output of the cellular inverter during the various possible serial combination changes of DC voltage electrical sources, and that is associated with an addressing circuit controlled by the output signals I and D from the circuits 105, 106 for detecting the arrival at limits of regulation range.

The addressing circuit for the compensation form generator 107 associates each compensation form with an amplitude of DC electrical voltage jump resulting from a serial combination change of DC voltage electrical source. In order to address a form of compensation, it deduces the change of combination effected from the output signals I and D from the upper and lower regulation range limit-crossing detector circuits, determines the corresponding voltage jump and addresses the compensation form associated with it.

The compensation forms can be established by experimentation for each combination change made possible by the operation of the combination selection circuit. They are themselves voltage steps correcting the lag in the correction circuit 103.

During a change of the serial combination of DC voltage electrical sources currently in use, the pre-compensation circuit adds a voltage step to the feedback control signal resulting in an immediate repositioning of the switch-mode regulator feedback control, and giving the correction circuit 103 the time to erase its lag.

In the example described, the compensation form generator 107 only stores one form of correction signal of one sign or the opposite sign since all the DC voltage electrical sources are assumed to have the same value and since the DC voltage electrical sources of the elementary cells are added one at a time. When it stores several compensation forms, which is the case where the voltage sources of the cells are not all the same, the compensation form generator 107 can comprise an additional input for selecting the compensation forms (ad in FIG. 5) controlled by an output from the combination selector 200 providing information on the amplitude of the voltage jump accompanying each serial combination change in progress.

The invention claimed is:

1. A cellular inverter for generating an alternating electrical voltage from a succession of various serial combinations of DC voltage electrical sources, comprising:

a series of several elementary cells and a switching control unit, said elementary cells having a bridge structure with a controlled switch in each of the branches of the bridge and a DC voltage electrical source in a first diagonal of the bridge, and being interconnected within the series via the second diagonal of their bridge structure, said switching control unit delivering the control commands for the controlled switches of the various elementary cells comprising:

a high-frequency switch-mode voltage regulation circuit operating so as to minimize an error signal that is representative of the difference existing between the electrical voltage present across the ends of the series of cells and a variable voltage setpoint sampling a model form of alternating voltage, and generating signals indicating arrival at upper and lower limits of its range of operation, and a circuit for selecting the serial combination of the DC voltage electrical sources of the elementary cells in service controlled by means of the signals indicating arrival at upper and lower limits of range of operation delivered by the high-frequency switch-mode voltage regulation circuit wherein said switching control unit comprises a high-frequency switch-mode voltage regulation circuit equipped with a pre-compensation device that is controlled by the signals indicating arrival at upper and lower limits of range of operation and that corrects its lag during a voltage jump caused by a change of the serial combination of DC voltage electrical sources currently in use.

2. The inverter as claimed in claim 1, wherein the pre-compensation circuit takes into account the values of the voltage jumps associated with the combination changes undertaken by the combination selection circuit, the combination change moments indicated by the limit reach signals and the reaction time of the high-frequency switch-mode voltage regulation circuit.

3. The inverter as claimed in claim 1, wherein the pre-compensation device comprises a compensation form generator controlled by means of the limit reach signals from the switch-mode voltage regulation circuit and an adder circuit that adds the compensation form delivered by the compensation form generator circuit to a signal from the high-frequency switch-mode voltage regulation circuit fixing the duration of a chopping period assigned to the conduction.

4. The inverter as claimed in claim 3, wherein the pre-compensation device comprises a compensation form generator controlled by means of the limit reach signals from the switch-mode voltage regulation circuit and of a signal (ad) coming from the combination selector that provides data on the amplitude of the voltage jump accompanying each change of serial combination, and an adder circuit adding the compensation form delivered by the compensation form generator circuit to a signal (Sc) from the high-frequency switch-mode voltage regulation circuit fixing the duration of a chopping period assigned to the conduction.

5. The inverter as claimed in claim 3, wherein the compensation form generator circuit is a memory storing, in sampled form, various forms of compensation established by experimentation for each combination change generated by the combination selection circuit.

6. The inverter as claimed in claim 3, wherein the compensation form generator circuit is a memory that contains compensation forms associated with the DC voltage jumps encountered during the combination changes and that is addressed by an addressing circuit deducing, from the limit reach signals, the DC voltage jump corresponding to the combination change carried out by the combination selection circuit.

* * * * *